US010928328B2

(12) United States Patent
Deefholts et al.

(10) Patent No.: US 10,928,328 B2
(45) Date of Patent: Feb. 23, 2021

(54) INSPECTION APPARATUS

(71) Applicant: Buhler Sortex Ltd., London (GB)

(72) Inventors: Benedict Deefholts, London (GB); Timothy Kelf, London (GB)

(73) Assignee: Buhler Sortex Ltd., London (GB)

( * ) Notice: Subject to any disclaimer, the term of this patent is extended or adjusted under 35 U.S.C. 154(b) by 0 days.

(21) Appl. No.: 16/070,826

(22) PCT Filed: Jan. 23, 2017

(86) PCT No.: PCT/EP2017/051342
§ 371 (c)(1),
(2) Date: Jul. 18, 2018

(87) PCT Pub. No.: WO2017/125609
PCT Pub. Date: Jul. 27, 2017

(65) Prior Publication Data
US 2019/0025224 A1 Jan. 24, 2019

(30) Foreign Application Priority Data
Jan. 22, 2016 (EP) .................................. 16152490

(51) Int. Cl.
*B07C 5/34* (2006.01)
*G01N 21/85* (2006.01)
*B07C 5/342* (2006.01)
*G06T 7/00* (2017.01)

(52) U.S. Cl.
CPC ........... *G01N 21/85* (2013.01); *B07C 5/3425* (2013.01); *G06T 7/0004* (2013.01);
(Continued)

(58) Field of Classification Search
CPC ... B07C 5/3422; B07C 5/3425; B07C 5/3427; B07C 2501/0018; B07C 2501/0054;
(Continued)

(56) References Cited

U.S. PATENT DOCUMENTS

| 3,305,089 A | * | 2/1967 | Fraenkel | B07C 5/3427 |
| | | | | 209/558 |
| 5,303,310 A | * | 4/1994 | Grove | G01N 15/0227 |
| | | | | 348/142 |

(Continued)

FOREIGN PATENT DOCUMENTS

| WO | 2013/115650 | 8/2013 |
| WO | 2015/063300 | 5/2017 |

OTHER PUBLICATIONS

International Search Report for corresponding Patent Application No. PCT/EP2017/051342 dated Feb. 23, 2017.

*Primary Examiner* — Joseph C Rodriguez
(74) *Attorney, Agent, or Firm* — Renner, Otto, Boisselle & Sklar, LLP (57) ABSTRACT

An inspection apparatus for inspecting a flow of particulate material, comprising: a background reflector (105) adjacent which in use falls a flow of particulate material (F); and a lighting unit (107) for illuminating an elongate viewing field (VF) across the background reflector (105), the viewing field (VF) having a first width ($w_1$); wherein the lighting unit (107) comprises a fixed, non-scanning light source (115), and the light source (115) is formed of one or more light elements (120) which define a second width ($w_2$) which is shorter than the first width ($w_1$) of the viewing field (VF).

21 Claims, 7 Drawing Sheets

(52) U.S. Cl.
CPC .......... *G01N 2201/068* (2013.01); *G01N 2201/0618* (2013.01); *G01N 2201/0634* (2013.01); *G01N 2201/0636* (2013.01); *G06T 2207/10016* (2013.01)

(58) Field of Classification Search
CPC .......... B07C 2501/0072; G01N 21/85; G01N 21/8806; G01N 2201/0618; G01N 2201/0634; G01N 2201/0636; G06T 7/0004; G06T 2207/10016
See application file for complete search history.

(56) References Cited

U.S. PATENT DOCUMENTS

| | | | |
|---|---|---|---|
| 5,379,949 A | | 1/1995 | Massen et al. |
| 5,419,438 A | * | 5/1995 | Squyres ............ B07C 5/3427 209/3.1 |
| 5,917,927 A | | 6/1999 | Satake et al. |
| 6,225,620 B1 | | 5/2001 | Campbell et al. |
| 6,252,189 B1 | * | 6/2001 | Campbell ............ B07C 5/3422 209/581 |
| 6,563,576 B2 | * | 5/2003 | Gschweitl ............ G01N 21/85 356/237.1 |
| 7,656,520 B2 | * | 2/2010 | Cohn ............ B07C 5/3427 209/581 |
| 8,283,589 B2 | * | 10/2012 | Janssens ............ G01N 21/21 209/576 |
| 8,985,342 B2 | * | 3/2015 | Tanaka ............ B07C 5/3425 209/639 |
| 9,114,436 B2 | * | 8/2015 | Berghmans ............ B07C 5/342 |
| 2018/0001352 A1 | * | 1/2018 | Huber ............ B07C 5/3427 |

\* cited by examiner

INSPECTION APPARATUS

This application is a national phase of International Application No. PCT/EP2017/051342 filed Jan. 23, 2017 and published in the English language, which claims priority to European Patent Application No. 16152490.5 filed Jan. 22, 2016, which are hereby incorporated herein by reference.

The present invention relates to an inspection apparatus for inspecting a flow of particulate material which is one or both of at least partially translucent or at least partially clear, such as flakes, and in particular plastic flakes. Clear or translucent flakes will generally transmit light but will absorb at certain wavelengths depending on their colour and or chemical composition.

Figure 1:
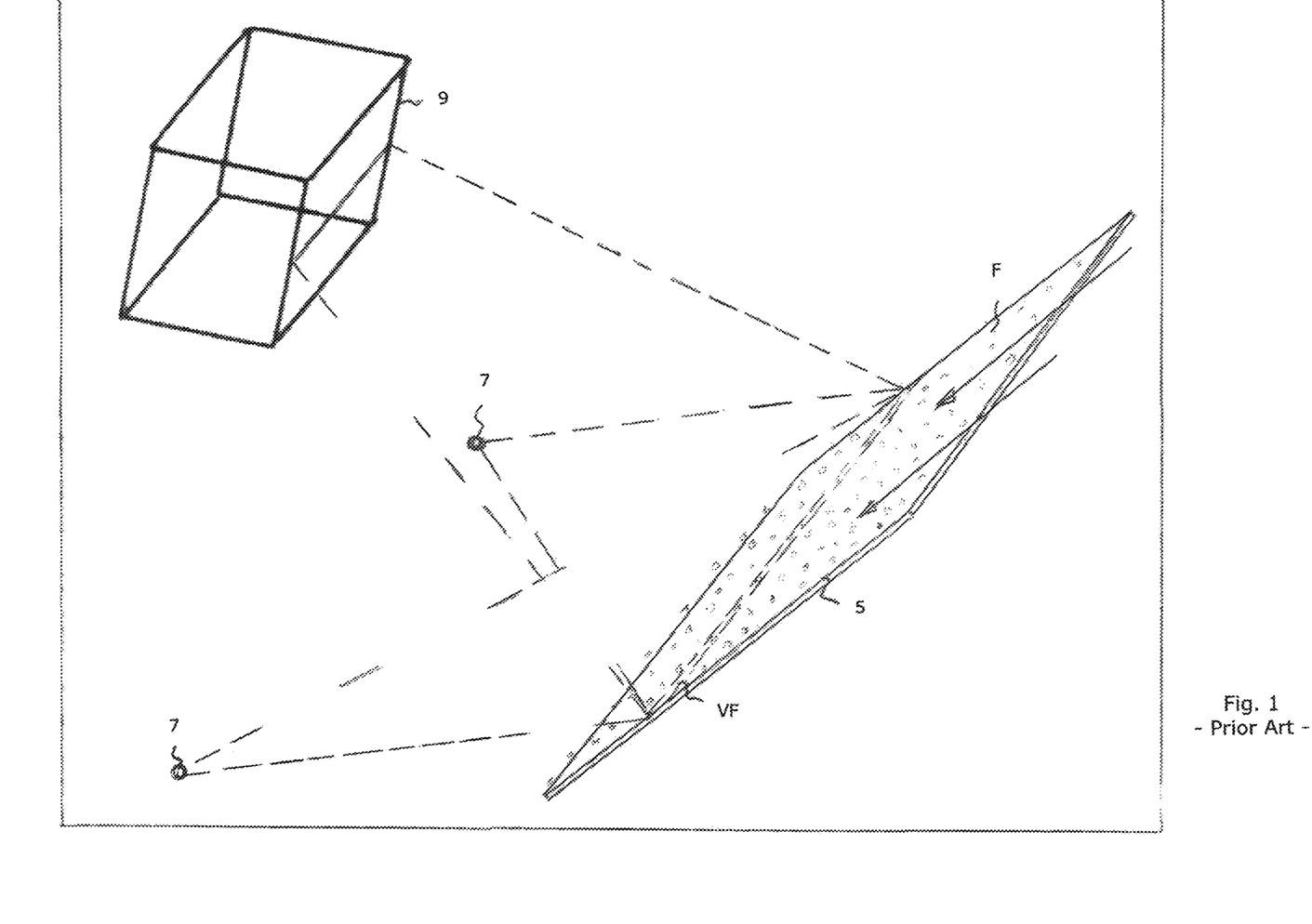
FIG. 1 illustrates a prior art sorting apparatus.

Existing apparatus, as illustrated in FIG. 1, comprise a reflective, white plate 5 with a generally uniform intensity, over which flakes F are fed, a plurality of light sources 7 at spaced locations to illuminate a region which is substantially similar or greater in width than a viewing field VF, and a camera 9 to image a line which extends across the viewing field VF. Such a prior art apparatus works in a satisfactory manner if the flakes were all to travel along the white plate 5 in contact therewith, i.e. touching the background plate. In practice, such flakes tend to travel at some distance (e.g. 5-10 mm) away from the plate which gives rise to shadows being formed ('shadowing').

Figure 2:
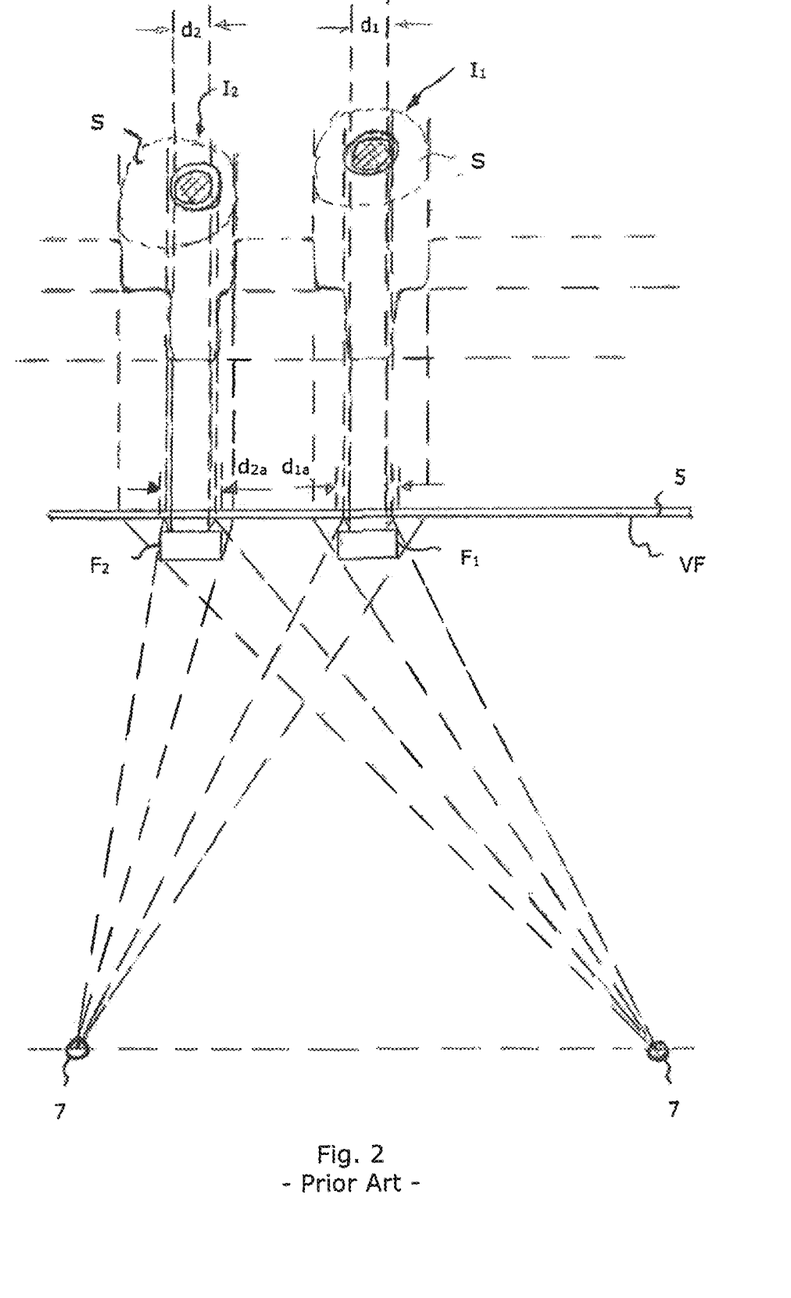
FIG. 2 represents the illumination of representative flakes at central and lateral regions of the viewing field of the sorting apparatus of FIG. 1, and the corresponding acquired images of the flakes.

FIG. 2 represents the illumination of representative flakes at central $F_1$ and lateral regions $F_2$ of the viewing field VF, and the corresponding images $I_1$, $I_2$ of the flakes $F_1$, $F_2$ as acquired by the camera 9.

As will been seen, in this existing apparatus, a significant region of the outer edges of the flakes $F_1$, $F_2$ is illuminated by light which travels along a path of light source-white plate-flake-camera, meaning that the discerned size $d_1$, $d_2$ of the flakes $F_1$, $F_2$, which is that in which light travels along a path of light source-flake-white plate-flake-camera, is significantly smaller than the actual size $d_{1a}$, $d_{2a}$ of the flakes $F_1$, $F_2$. The consequence of this significant edge illumination is to provide poor resolution of small flakes F.

In addition, the acquired images $I_1$, $I_2$ include a significant shadow border S, which can make the identification of individual flakes F difficult and could lead to miss-identification of adjacent acceptable flakes F as being defective whilst also reducing the signal levels in defective flakes F.

In other existing apparatus, such as disclosed in WO-A-2013/115650, a focused light beam is scanned across the path along which flakes are fed, and reflected light is detected by a sensor.

This apparatus also has reduced resolution, in being limited to rate of scanning of the light beam.

The present inventors have recognized that the resolution of such existing apparatus is limited, in that the edges of the flakes F are subjected to a different light path, where light travels along a single-absorption light path of light source-white plate-flake-camera, as compared to the central region of the flakes F, where light travels along a double-absorption light path of light source-flake-white plate-flake-camera, and the absorption is 50% less at the outer edges of the flakes F; meaning that the apparent size of the flakes F as discernible from the acquired images and corresponding to the double absorption is of significantly smaller size than the actual size of the flakes F.

By providing an arrangement which promotes the transmission of light twice through the flakes F, once when illuminating the reflective plate 5 and once when viewing the reflective plate 5 through the flakes F, the present invention advantageously provides that, at wavelengths where the flakes F are transparent, there is little or no reduction of light level, but, at those wavelengths where the flakes F absorb light, the amount of light absorbed is doubled and hence contrast is greater.

It is an aim of the present invention to provide an improved inspection apparatus for inspecting a flow of particulate material which is one of at least partially translucent or at least partially clear, such as flakes, and in particular plastic flakes, and in particular an inspection apparatus which utilizes a fixed or non-scanning light source that emits light from a region close to a camera and in which the light source has a width that is substantially narrower than a width of the viewing field. Width in this context means the direction across a background plate substantially orthogonal to the direction of flow of the particulate material across the background plate.

In one aspect the present invention provides an inspection apparatus for inspecting a flow of particulate material which consists at least in part of one or both of at least partially translucent particles or at least partially clear particles, comprising: a background reflector adjacent which in use falls a flow of particulate material; and a lighting unit for illuminating an elongate viewing field across the background reflector, the viewing field having a first width across the background reflector; characterized in that the lighting unit comprises a fixed, non-scanning light source, wherein the light source is formed of one or more light elements and wherein the light source has a second width across the background reflector which is less than 50% of the first width of the viewing field, whereby the second width of the light source is substantially narrower than the first width of the viewing field.

In one embodiment the second width of the light source is aligned in substantially parallel relation to the first width of the viewing field, optionally extending horizontally.

In one embodiment the light source is an incandescent lamp, optionally a halogen bulb, optionally a linear halogen bulb.

In one embodiment the second width of the light source is less than 25% of the first width of the viewing field.

In one embodiment the light source is a single light source comprising a single light element or a plurality of light elements, optionally an elongate light source, and wherein the second width of the light source is less than 150 mm.

In one embodiment the lighting unit further comprises a baffle which is disposed substantially centrally and forwardly of the light source to render a brightness profile of illumination more uniform across the viewing field than in the absence of the baffle, optionally the baffle comprises an elongate element which extends substantially orthogonally to the first width of the viewing field, optionally vertically, optionally the baffle comprises a rectangular plate, optionally the baffle has a width of from 5% to 30% of the second width of the light source.

In another embodiment the light source comprises a plurality of light elements, optionally elongate or point light elements, which are arranged in spaced relation.

In one embodiment the light source comprises first and second light elements which are spaced from each other by a distance of from 5% to 30% of the second width of the light source.

In one embodiment the apparatus further comprises: a camera unit for imaging a line which extends across the viewing field, optionally the camera unit comprises a line scan camera which acquires line images from which at least one area image, optionally a plurality of area images at different wavelengths, are formed, optionally the camera has a resolution of less than 1.5 mm, optionally less than 1.2 mm, optionally the lighting unit has an illumination path, the camera unit has a detection path and the illumination path and the detection path have an acute angular relation β of less than 45 degrees, optionally less than 25 degrees, optionally less than 10 degrees.

In another aspect the present invention provides an inspection apparatus for inspecting a flow of particulate material, comprising: a background reflector adjacent which in use falls a flow of particulate material; and a lighting unit for illuminating an elongate viewing field, having a width, across the background reflector; characterized in that the lighting unit comprises either: (a) a light source having a width and formed of one or more light elements, and a baffle which is disposed substantially centrally and forwardly of the light source and has a width of from 5% to 30% of the width of the light source, or (b) a light source having a width and formed of a plurality of light elements, which are arranged in spaced relation and which are spaced by a distance of from 5% to 30% of the width of the light source at or near a central portion of the light source, whereby a brightness profile of illumination is rendered more uniform across the viewing field than in the absence of either the baffle or the spaced relation between the plurality of light elements at the central portion of the light source, and, optionally, wherein the baffle comprises an elongate element which extends substantially orthogonally to the width of the viewing field across the background reflector, optionally vertically, optionally the baffle comprises a rectangular plate.

In one embodiment the background reflector is a diffuse reflector, optionally a plate, optionally a white plate.

In one embodiment the lighting unit further comprises a curved reflector which reflects the light from the light source to illuminate the viewing field.

In one embodiment the particulate material comprises flakes, optionally plastic or polymeric flakes.

Figure 3:
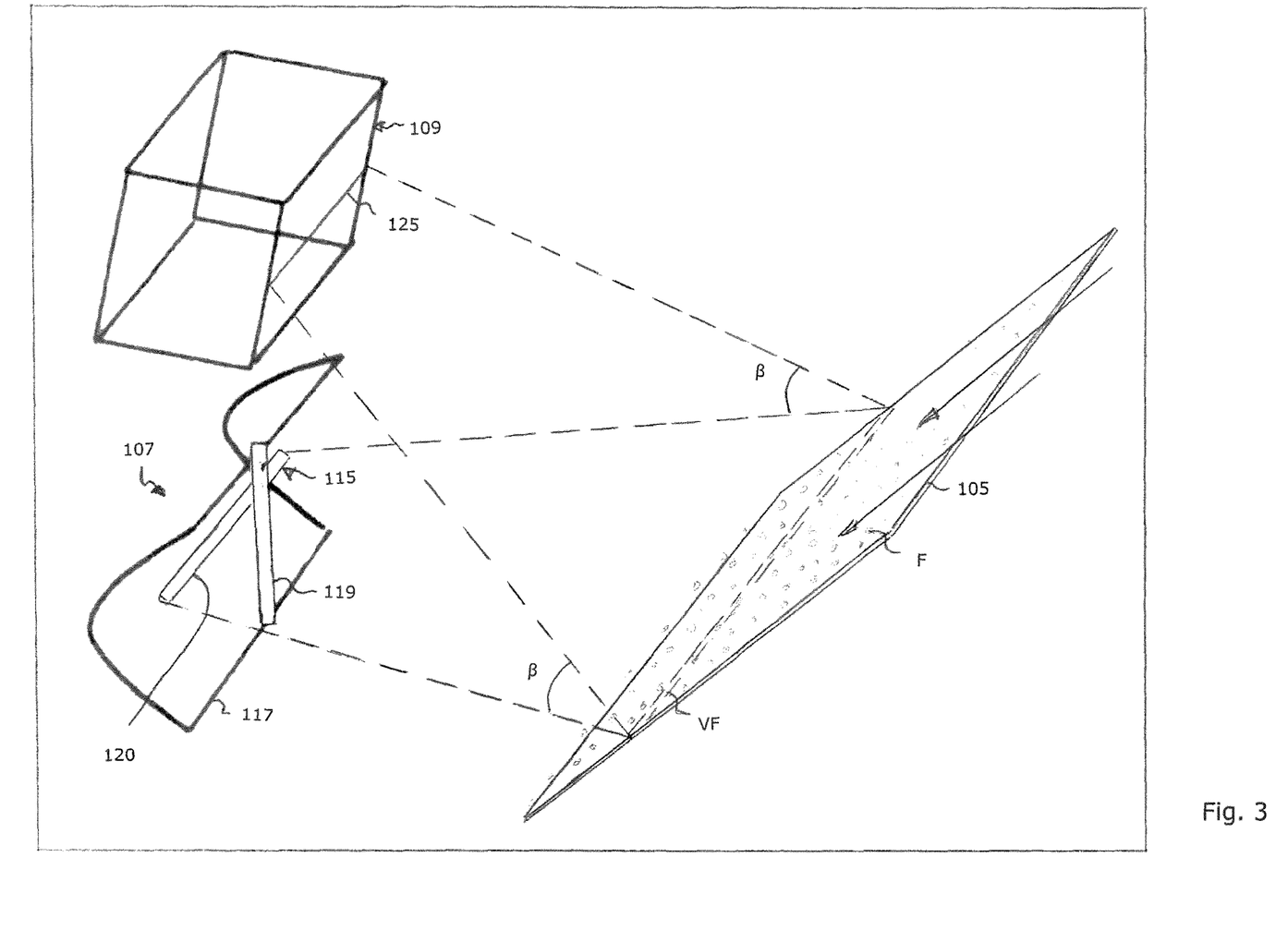
FIG. 3 illustrates a sorting machine incorporating an inspection apparatus in accordance with a first embodiment of the present invention.
Figure 4:
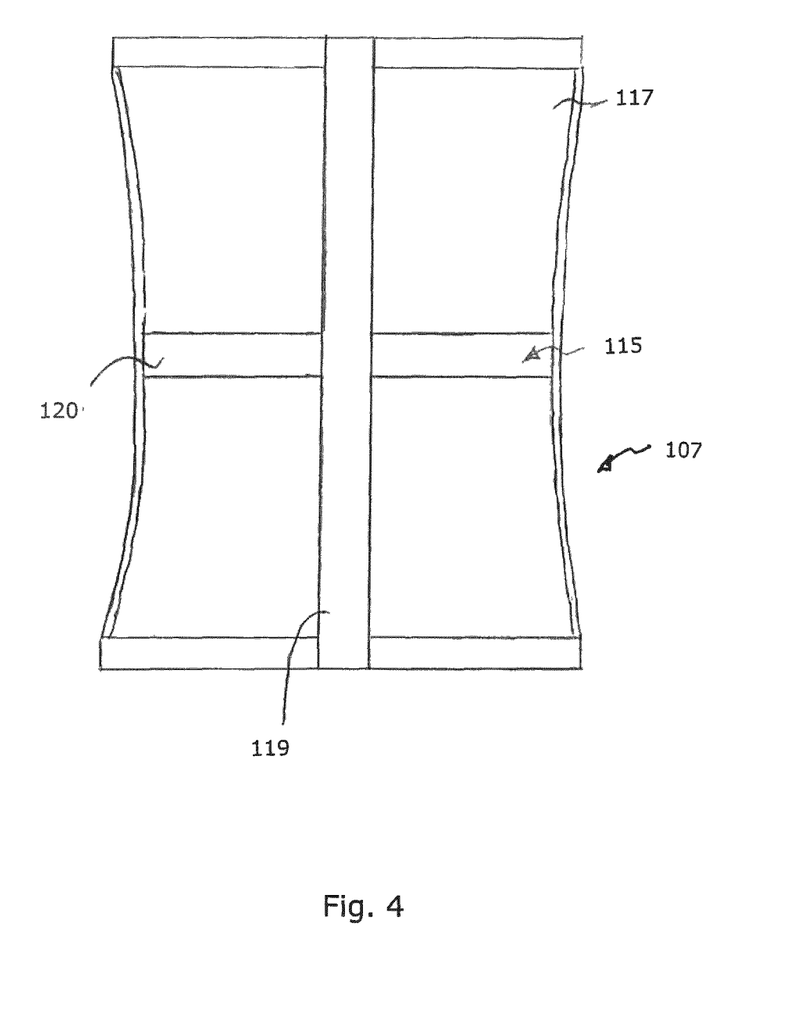
FIG. 4 illustrates a front view of the lighting unit of the inspection apparatus of FIG. 3.

Preferred embodiments of the present invention will now be described hereinbelow by way of example only with reference to the accompanying drawings, in which:

FIGS. 5(*a*) to (*c*) illustrate brightness profiles across the viewing field for the lighting unit of FIG. 4 having a baffle with a width of respective ones of 10%, 15% and 25% of the width of the light source;

FIG. 5(*d*) illustrates a brightness profile for the lighting unit of FIG. 4 where omitting the baffle;

FIGS. 3 and 4 illustrate a sorting machine incorporating an inspection apparatus in accordance with one embodiment of the present invention.

The inspection apparatus comprises a diffuse background reflector 105 adjacent which fall flakes F, a lighting unit 107 for illuminating an elongate viewing field VF, having a width $w_1$, across the background reflector 105, and a camera unit 109 for imaging a line which extends across the viewing field VF.

In this embodiment the flakes F comprise one or both of at least partially translucent or at least partially clear flakes, in one embodiment one or both of translucent or clear flakes, here plastic or polymeric flakes.

In this embodiment the background reflector 105 is a plate, here a white plate.

In this embodiment the lighting unit 107 has an illumination path 110 and the camera unit 109 has a detection path 111, and the illumination path 110 and the detection path 111 are arranged to have an acute angular relation β of less than 20 degrees, optionally less than 10 degrees.

In this embodiment the lighting unit 107 comprises a light source 115, a curved reflector 117 which reflects light from the light source 115 to illuminate the viewing field VF, and a baffle 119 which is disposed centrally of the at least one light source 115 and forwardly of the curved reflector 117 to render the illumination more uniform across the viewing field VF. It will be noted that a uniform brightness profile across the viewing field VF is not essential in order to benefit from the double absorption through the flakes F, but the provision of a uniform brightness profile simplifies the system design and provides the system with an increased dynamic range. It will also be noted that the intention of the central baffle 119 (and the intention of the spacing between the multiple light elements 120 as set out below) is to render the brightness profile more uniform across the width $w_1$ of the viewing field VF essentially by causing a block to the transmission of a part of the high intensity light. The baffle 119 is not intended to cause a change in the alignment of light, in the way, for instance, that a collimator (e.g. a 'soda straw' collimator) does, that is to say the baffle 119 is not intended to change the angular spread of light from the light source 115.

In this embodiment the light source 115 comprises a single light element 120.

In this embodiment the light element 120 is an incandescent lamp, here a linear halogen bulb. Normally, using such a single light element would result in uneven illumination across the VF, but the configuration of the lighting unit 107 of the present invention enables illumination with a generally uniform intensity from the single light element 120.

In this embodiment the light source 115 is an elongate light source which has width $w_2$, here of about 100 mm, which is substantially less than the width $w_1$ of the viewing field VF.

In this embodiment the light source 115 has a width $w_2$ of less than 50% of the width $w_1$ of the viewing field VF, and optionally less than 25% of the viewing field VF.

In this embodiment the light source 115 is aligned in substantially parallel relation to the viewing field VF, here extending horizontally.

In an alternative embodiment the lighting unit 107 could comprise a plurality of light elements 120.

In one embodiment, such as where inspecting in the visible spectrum, the light source 115 could be provided by a combination of light-emitting diodes (LEDs).

In this embodiment the viewing field VF is about 600 mm wide and about 1 mm in height, and the effective lighting area is greater than the width $w_1$ of the viewing field VF, here about 700 mm in width and about 50 mm in height.

In this embodiment the baffle 119 comprises an elongate element which extends orthogonally, here vertically.

In this embodiment the baffle 119 comprises a rectangular plate.

In this embodiment the baffle 119 has a width $w_3$ at the central region thereof of about 15 mm.

In this embodiment the baffle 119 has a width $w_3$ of 15% of the width $w_2$ of the light source 115, and optionally from about 5% to 30% of the width $w_2$ of the light source 115.

Figure 5:
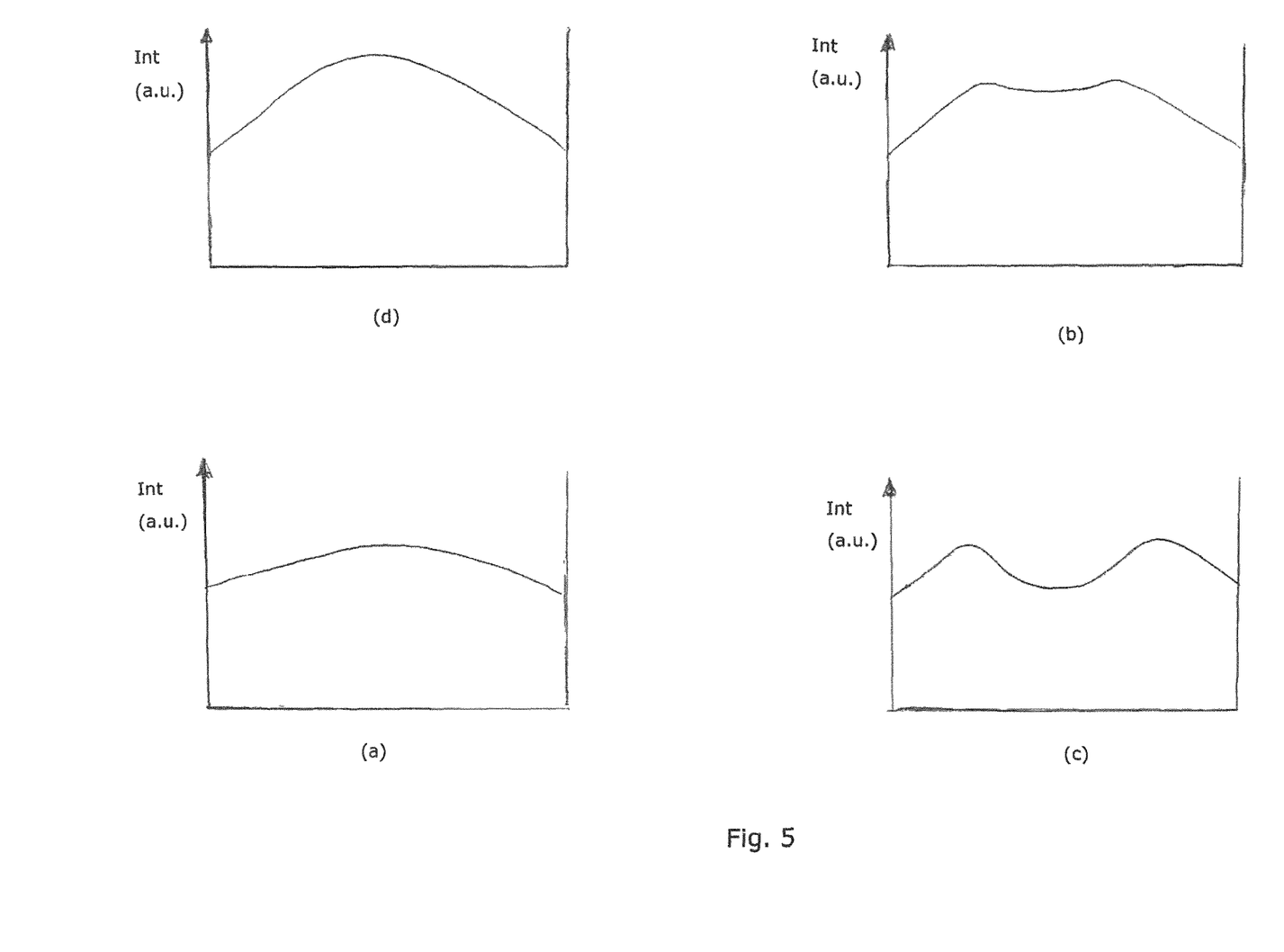

FIG. 5(*a*) illustrates a brightness profile across the viewing field VF for the baffle 119 of the present embodiment, FIGS. 5(*b*) and (*c*) illustrate brightness profiles across the viewing field VF for baffles 119 having widths $w_3$ which are too short and too long, respectively, in relation to the width $w_2$ of the light source 115 with reference to the optimum brightness profile of FIG. 5(*a*), and FIG. 5(*d*) illustrates a brightness profile across the viewing field VF for the lighting unit 107 where omitting the baffle 119.

As will be seen, the baffle 119 has a significant effect in rendering the intensity profile of the illumination more uniform.

Conventionally, single light sources have not been used because of a large difference in brightness at central and lateral, edge regions of elongate illumination, but, as will be seen, the baffle 119, as devised by the present inventors, has a significant effect in rendering the intensity profile of the illumination more uniform.

In this embodiment the camera 109 comprises a line scan camera 125 which acquires line images from which area images, here at different wavelengths, are constructed.

Figure 6:
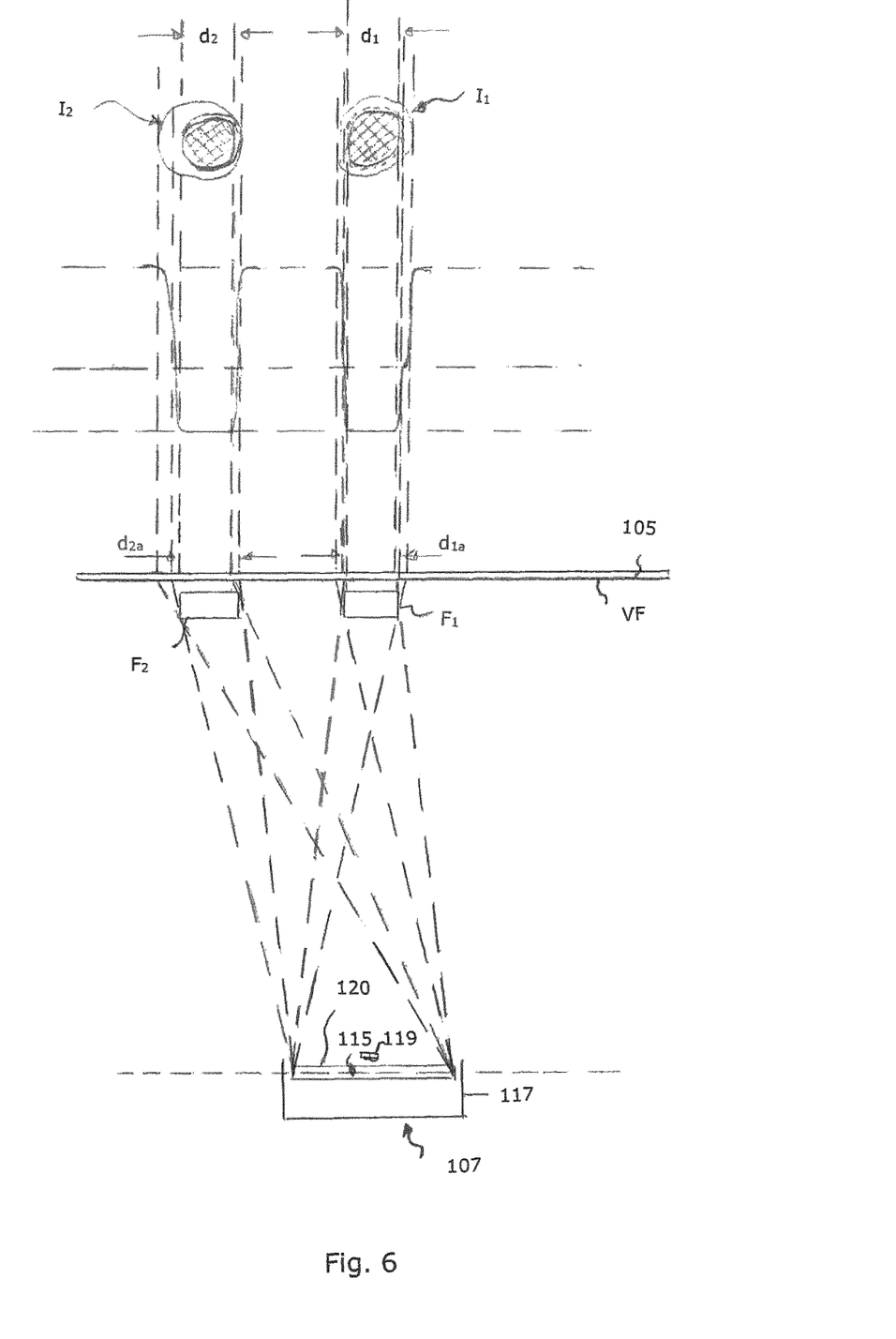
FIG. 6 represents the illumination of representative flakes at central and lateral regions of the viewing field of the inspection apparatus of FIG. 3, and the corresponding acquired images of the flakes.

FIG. 6 represents the illumination of representative flakes at central $F_1$ and lateral regions $F_2$ of the viewing field VF, and the corresponding images $I_1$, $I_2$ of the flakes $F_1$, $F_2$ as acquired by the camera 125.

With this configuration, as compared to the existing apparatus as described above, a much smaller region of the outer edges of the flakes $F_1$, $F_2$ is illuminated by light which travels along the single-absorption light path of light source-white plate-flake-camera, meaning that the discerned size of maximum absorption $d_1$, $d_2$ of the flakes $F_1$, $F_2$, which is that in which light travels along the double-absorption light path of light source-flake-white plate-flake-camera, corresponds much more precisely to the actual size $d_{1a}$, $d_{2a}$ of the flakes $F_1$, $F_2$, which enables much improved resolution of the flakes F, in this embodiment of the order of 1 mm.

In addition, the acquired images $I_1$, $I_2$ include a significantly-reduced shadow border S, which provides for enhanced identification of individual flakes F and reduces the chance of miss-identification of adjacent good flakes F as being defective.

Finally, it will be understood that the present invention has been described in its preferred embodiments and can be modified in many different ways without departing from the scope of the invention as defined by the appended claims.

Figure 7:
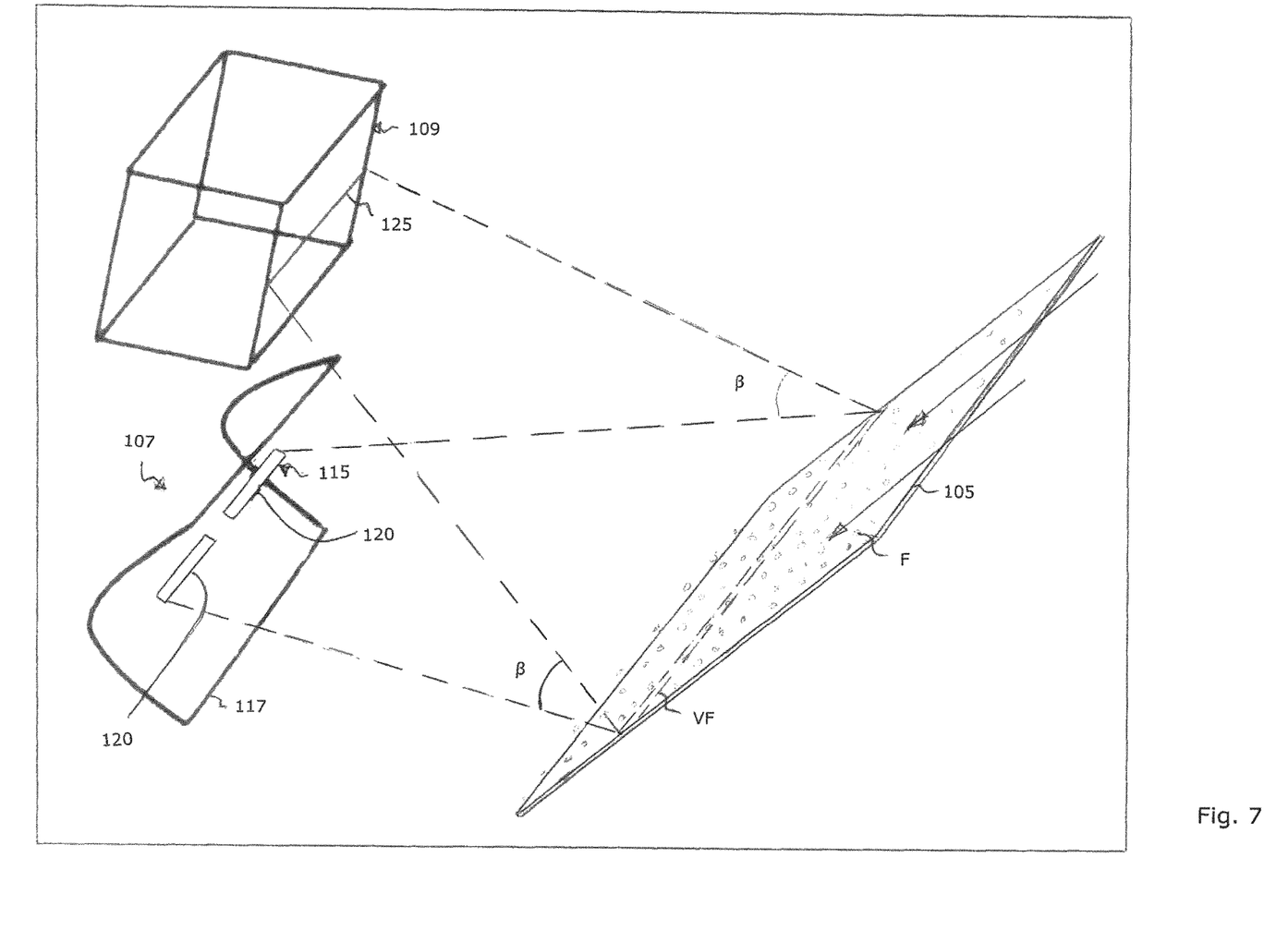
FIG. 7 illustrates a sorting machine incorporating an inspection apparatus in accordance with a second embodiment of the present invention.

In another, modified embodiment, as illustrated in FIG. 7, the light source 115 could comprise a plurality of light elements 120 which are arranged in spaced relation, and the lighting unit 107 omit the baffle 119. In this illustrated embodiment the light source 115 comprises first and second light elements 120, here disposed in symmetrical relation to the viewing field VF, which are spaced by a distance of from 5% to 30% of the width $w_2$ of the light source 115 at least at a central portion of the light source 115. It will be noted that the intention of such spacing between the light elements 120 is to render the brightness profile of the light source 115 more uniform across the width $w_1$ of the viewing field VF, essentially by causing non-transmission of light from a central section of the light source 115.

In addition, in alternative embodiments, the lighting unit 107 could omit the curved reflector 117.

Furthermore, although the described embodiments have been described in relation to a sorting machine for use in sorting, the described inspection apparatus could be used in other apparatus, such as monitoring or classifying apparatus, such as in an analyzer, for example, in analyzing plastic flakes for non-polyethylene terephthalate (PET) flakes.

The present invention also extends to the invention as defined in the following numbered paragraphs:

1. An inspection apparatus for inspecting a flow of particulate material, comprising:
    a background reflector (105) adjacent which in use falls a flow of particulate material (F); and
    a lighting unit (107) for illuminating an elongate viewing field (VF) across the background reflector (105), the viewing field (VF) having a first length ($w_1$);
    characterized in that the lighting unit (107) comprises a fixed, non-scanning light source (115), wherein the light source (115) is formed of one or more light elements (120) which define a second length ($w_2$) which is shorter than the first length ($w_1$) of the viewing field (VF).
2. The apparatus of paragraph 1, wherein the light source (115) is aligned in substantially parallel relation to the viewing field (VF), optionally extending horizontally.
3. The apparatus of paragraph 1 or 2, wherein the light source (115) is an incandescent lamp, optionally a halogen bulb, optionally a linear halogen bulb.
4. The apparatus of any of paragraphs 1 to 3, wherein the second length ($w_2$) of the light source (115) is less than 50% of the first length ($w_1$) of the viewing field (VF), optionally less than 25% of the first length ($w_1$) of the viewing field (VF).
5. The apparatus of any of paragraphs 1 to 4, wherein the light source (115) is a single light source comprising a single light element (120) or a plurality of light elements (120), optionally an elongate light source, optionally less than 150 mm in length.
6. The apparatus of any of paragraphs 1 to 5, wherein the lighting unit (107) further comprises a baffle (119) which is disposed substantially centrally and forwardly of the light source (115) to render the illumination more uniform across the viewing field (VF), optionally the baffle (119) comprises an elongate element which extends substantially orthogonally to the viewing field (VF), optionally vertically, optionally the baffle (119) comprises a rectangular plate, optionally the baffle (119) has a width ($w_3$) at a central region thereof of from 5% to 30% of the second length ($w_2$) of the light source (115).
7. The apparatus of any of paragraphs 1 to 5, wherein the light source (115) comprises a plurality of light elements (120), optionally elongate or point light elements, which are arranged in spaced relation.
8. The apparatus of paragraph 7, where the light source (115) comprises first and second light elements (120) which are spaced by a distance of from 5% to 30% of the second length ($w_2$) of the light source (115).
9. The apparatus of any of paragraphs 1 to 8, further comprising:
    a camera unit (109) for imaging a line which extends across the viewing field (VF), optionally the camera unit (109) comprises a line scan camera (125) which acquires line images from which at least one area image, optionally a plurality of area images at different wavelengths, are formed, optionally the camera (125) has a resolution of less than 1.5 mm, optionally less than 1.2 mm, optionally the lighting unit (107) has an illumination path (110), the camera unit (109) has a detection path (111) and the illumination path (110) and the detection path (111) have an acute angular relation β of less than 45 degrees, optionally less than 25 degrees, optionally less than 10 degrees.

10. An inspection apparatus for inspecting a flow of particulate material, comprising:
   a background reflector (105) adjacent which in use falls a flow of particulate material (F);
   a lighting unit (107) for illuminating an elongate viewing field (VF) across the background reflector (105), wherein the lighting unit (107) has an illumination path (110); and
   a camera unit (109) for imaging a line which extends across the viewing field (VF), wherein the camera unit (109) has a detection path (111);
   characterized in that the illumination path (110) and the detection path (111) have an acute angular relation β of less than 45 degrees, optionally the angular relation β is less than 25 degrees, optionally less than 10 degrees.

11. An inspection apparatus for inspecting a flow of particulate material, comprising:
   a background reflector (105) adjacent which in use falls a flow of particulate material (F); and
   a lighting unit (107) for illuminating an elongate viewing field (VF) across the background reflector (105);
   characterized in that the lighting unit (107) comprises a light source (115), wherein the light source (115) is formed of one or more light elements (120), and a baffle (119) which is disposed substantially centrally and forwardly of the light source (115) to render the illumination more uniform across the viewing field (VF), optionally the baffle (119) comprises an elongate element which extends substantially orthogonally to the viewing field (VF), optionally vertically, optionally the baffle (119) comprises a rectangular plate, optionally the baffle (119) has a width ($w_3$) at a central region thereof of from 5% to 30% of the second length ($w_2$) of the light source (115).

12. An inspection apparatus for inspecting a flow of particulate material, comprising:
   a background reflector (105) adjacent which in use falls a flow of particulate material (F); and
   a lighting unit (107) for illuminating an elongate viewing field (VF) across the background reflector (105);
   characterized in that the lighting unit (107) comprises a light source (115), wherein the light source (115) is formed of a plurality of light elements (120), optionally elongate or point light elements, which are arranged in spaced relation, optionally comprising first and second light elements (120) which are spaced by a distance of from 5% to 30% of the second length ($w_2$) of the light source (115).

13. The apparatus of any of paragraphs 1 to 12, wherein the background reflector (105) is a diffuse reflector, optionally a plate, optionally a white plate.

14. The apparatus of any of paragraphs 1 to 13, wherein the lighting unit (107) further comprises a curved reflector (117) which reflects the light from the light source (115) to illuminate the viewing field (VF).

15. The apparatus of any of paragraphs 1 to 14, wherein the particulate material (F) comprises flakes, optionally one or both of at least partially translucent flakes or at least partially clear flakes, optionally plastic or polymeric flakes.

The invention claimed is:

1. A flake-inspection apparatus adapted to inspect a flow of flakes which consists at least in part of one or both of at least partially translucent flakes or at least partially clear flakes, comprising:
   a background reflector plate over which flakes are fed and adjacent which, in use, falls the flow of flakes, wherein the background reflector plate is a diffuse reflector; and
   a lighting unit comprising a single fixed, non-scanning light source for illuminating an elongate viewing field width-wise across the background reflector plate, the viewing field having a first width across the background reflector plate; and
   a camera unit for imaging a line which extends across the viewing field;
   wherein the background reflector plate, the light source and the camera unit are configured with respect to each other such that, in use, light travels:
      along a single-absorption light path of the light source-to-the background reflector plate-to-flake-to-the camera unit; and/or
      along a double-absorption light path of the light source-to-flake-to-the background reflector plate-to-flake-to-the camera unit;
   wherein the light source is formed of one or more light elements and has a second overall width which is less than 50% of the first width of the viewing field, whereby the second overall width of the light source is substantially narrower width-wise than the first width of the viewing field; and
   wherein the lighting unit has an illumination path, the camera unit has a detection path, and the illumination path and the detection path have an acute angular relation of less than 25 degrees,
   whereby double-absorption light paths are promoted in which transmission of light through flakes occurs twice, and, at wavelengths where flakes absorb light, an amount of light absorbed by flakes is doubled and contrast is greater.

2. The apparatus of claim 1, wherein the second overall width of the light source is aligned in substantially parallel relation to the first width of the viewing field.

3. The apparatus of claim 1, wherein the light source is an incandescent lamp, a halogen bulb, or a linear halogen bulb.

4. The apparatus of claim 1, wherein the second overall width of the light source is less than 25% of the first width of the viewing field.

5. The apparatus of claim 1, wherein the second width of the light source is less than 150 mm.

6. The apparatus of claim 1, wherein the lighting unit further comprises a baffle which is disposed centrally and forwardly of the light source to render a brightness profile of illumination more uniform across the viewing field than in the absence of the baffle.

7. The apparatus of claim 1, wherein the plurality of light elements which are arranged in spaced relation.

8. The apparatus of claim 7, wherein the light source comprises first and second light elements which are spaced from each other by a distance of from 5% to 30% of the second overall width of the light source.

9. The apparatus of claim 1, wherein the camera unit comprises a line scan camera which acquires line images from which at least one area image is formed.

10. A flake-inspection apparatus adapted to inspect a flow of flakes which consists at least in part of one or both of at least partially translucent flakes or at least partially clear flakes, comprising:
- a background reflector plate over which flakes are fed and adjacent which, in use, falls the flow of flakes, wherein the background reflector plate is a diffuse reflector; and
- a lighting unit comprising a single fixed, non-scanning light source for illuminating an elongate viewing field width-wise across the background reflector plate the viewing field having a first width across the background reflector plate; and
- a camera unit for imaging a line which extends across the viewing field;
- wherein the background reflector plate, the light source and the camera unit are configured with respect to each other such that, in use, light travels:
  - along a single-absorption light path of the light source-to-the background reflector plate-to-flake-to-the camera unit; and/or
  - along a double-absorption light path of the light source-to-flake-to-the background reflector plate-to-flake-to-the camera unit;
- wherein either:
  - (a) the light source is formed of one or more light elements and has a second overall width, and the lighting unit further comprises a baffle which is disposed centrally and forwardly of the light source and has a third width across the background reflector plate of from 5% to 30% of the second overall width of the light source, or
  - (b) the light source is formed of a plurality of light elements has a second overall width, and wherein the light elements are arranged in spaced relation and spaced by a distance of from 5% to 30% of the second overall width of the light source at a central portion of the light source.

11. The apparatus of claim 1, wherein the background reflector plate is a white plate.

12. The apparatus of claim 1, wherein the lighting unit further comprises a curved reflector which reflects the light from the light source to illuminate the viewing field.

13. The apparatus of claim 1, wherein the flakes are plastic or polymeric flakes.

14. The apparatus of claim 10, wherein the background reflector plate is a white plate.

15. The apparatus of claim 10, wherein the lighting unit further comprises a curved reflector which reflects the light from the light source to illuminate the viewing field.

16. The apparatus of claim 10, wherein the flakes are plastic or polymeric flakes.

17. The apparatus of claim 6, wherein the baffle comprises an elongate element which extends substantially orthogonally to the first width of the viewing field.

18. The apparatus of claim 6, wherein the baffle has a third width across the background reflector plate of from 5% to 30% of the second overall width of the light source.

19. The apparatus of claim 9, wherein the line images acquired by the line scan camera are formed as a plurality of area images at different wavelengths.

20. The apparatus of claim 1, wherein the illumination path and the detection path have an acute angular relation of less than 10 degrees.

21. The apparatus of claim 10, wherein the baffle comprises an elongate element which extends substantially orthogonally to the first width of the viewing field.

* * * * *